Feb. 26, 1935.  A. O. CODNEY  1,992,813
SPECIFIC GRAVITY INDICATING DEVICE
Filed July 16, 1930
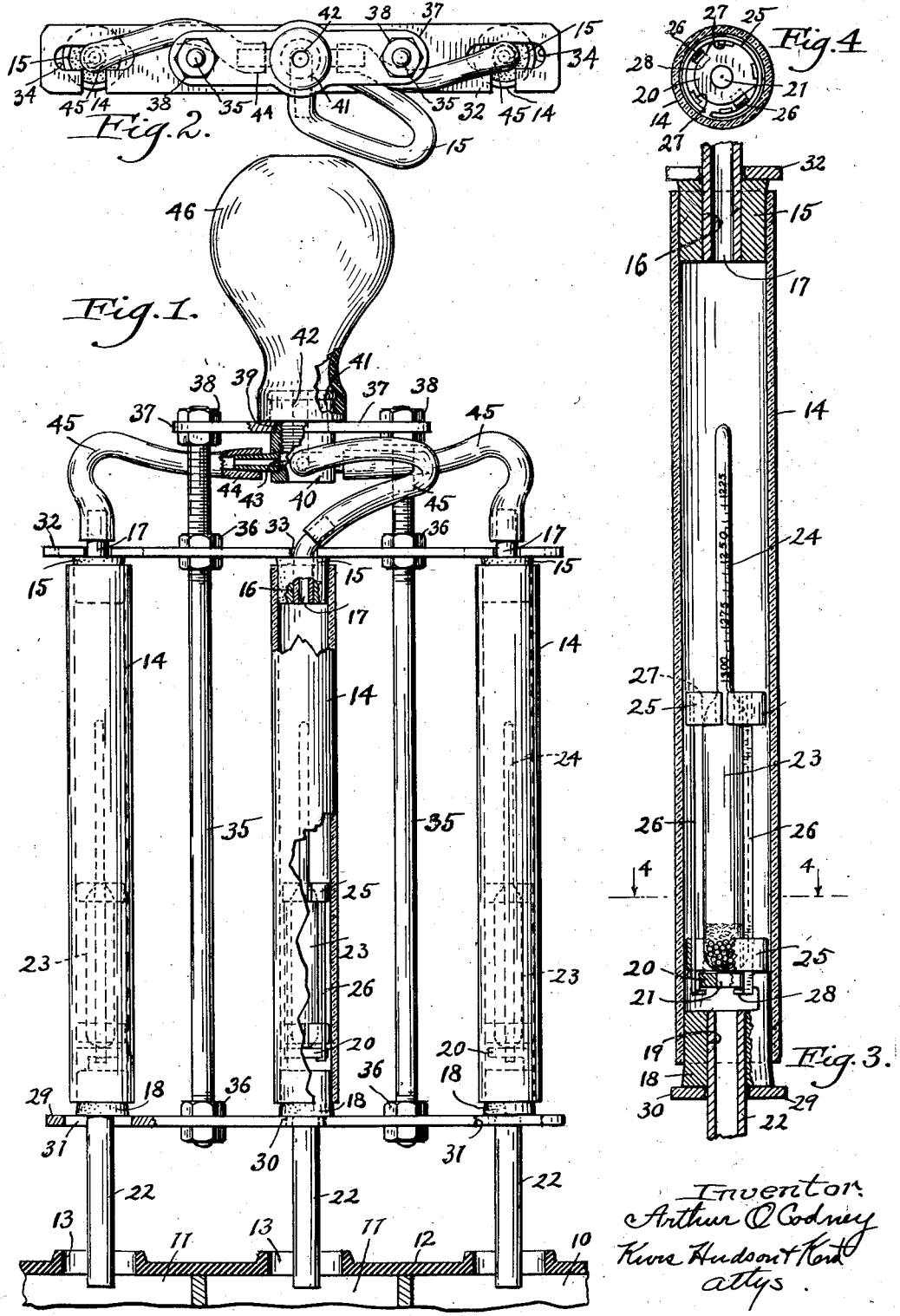
Inventor
Arthur O Codney
Kwis Hudson Kent
attys.

Patented Feb. 26, 1935

1,992,813

UNITED STATES PATENT OFFICE 1,992,813

SPECIFIC GRAVITY INDICATING DEVICE

Arthur O. Codney, Cleveland Heights, Ohio, assignor to Willard Storage Battery Company, Cleveland, Ohio, a corporation of West Virginia Application July 16, 1930, Serial No. 468,350

3 Claims. (Cl. 265—45)

This invention relates to a device for indicating the specific gravities of liquids, and has more particularly to do with the determining of specific gravities of electrolyte in storage battery cells.

An object of the present invention is to provide a device which is capable of indicating simultaneously the specific gravities of liquids in different compartments for the purpose of comparison.

A further object of the invention is to provide a device which, in addition to visibly indicating simultaneously the specific gravity readings of different liquids, will also permit the operator to ascertain inequalities in the specific gravities of different liquids simultaneously, by visual differences in heights of liquids drawn simultaneously into the device.

A further object of the invention is to provide a device of the character referred to which is operable from a single source of vacuum, thereby enabling a simultaneous indication of the specific gravities of a plurality of separate liquids.

With the objects above indicated and other objects hereinafter explained in view, the invention consists in the construction and combination of elements hereinafter described and claimed.

Referring to the drawing:

Figure 1 is a front elevational view of a device embodying the present invention, portions of which are broken away to more clearly disclose the construction, and also showing its relationship with respect to the vent holes of a storage battery.

Fig. 2 is a top plan view of Fig. 1 with the suction means removed.

Fig. 3 is a longitudinal sectional view of one of the liquid receiving members on an enlarged scale, and showing in detail the construction and association of elements.

Fig. 4 is a transverse sectional view taken on line 4—4 of Fig. 3.

In the drawing, 10 represents a portion of a storage battery having a plurality of cells or compartments 11, three of which are herein shown, which are adapted to contain a suitable electrolyte, the specific gravities of which are to be determined. The battery 10 has a cover 12 which is provided with vent holes 13 disposed immediately above the respective cells 11. These vent holes 13 are ordinarily closed by suitable plugs, not shown, which may be removed for the purpose of taking a reading of the specific gravity of the electrolyte within any of the cells.

Heretofore it has been customary to determine the specific gravity of the electrolyte within a cell by the use of a hydrometer syringe, in which case it was necessary to take the reading of the electrolyte in each cell separately. This, of course, consumed considerable time, and comparison of the specific gravities of the electrolyte in the cells of which the reading was taken, was by memory solely. This method, while extensively employed, was not as accurate as necessary for efficient test and operation.

It is, therefore, one of the important features of the present invention to provide a device for indicating the specific gravities of liquids in a plurality of cells simultaneously, for the purpose of visual comparison, and, further, to be able to check the specific gravity readings by visual observance of any difference in height of the electrolyte drawn into the liquid receiving members while the specific gravity readings are being taken.

A plurality of liquid receiving members 14, preferably consisting of the desired lengths of glass tubing, are spaced a predetermined distance apart, which normally corresponds with the center to center distances of the vent holes 13 of the storage battery 10. The upper ends of the liquid receiving members 14 are sealed by rubber bushings or plugs 15 which fit frictionally tight therein and have openings 16 extending longitudinally therethrough. The tubular members 17, preferably of hard rubber, have one of their ends secured within the openings 16 while the opposite ends are free, for a purpose to be later described.

The lower ends of the liquid receiving members 14 are also sealed in a similar manner to the opposite ends of the members, by rubber bushings or plugs 18 which fit frictionally tight therein. These bushings 18 have openings 19 extending longitudinally therethrough and are further provided with offset portions 20 spaced apart from the body portion of the bushing 18 but joined integrally therewith. These extensions also have openings 21 extending transversely therethrough and substantially in alignment with the openings 19, all of which is for a purpose later to be described.

Tubular members 22, preferably of hard rubber, have one of their ends secured within the openings 19 in the bushings 18, while the opposite ends are somewhat extended and free and adapted to be immersed in the liquid of which the specific gravity reading is desired.

Disposed within the liquid receiving members 14 are hydrometer floats or members 23, the lower ends of which are adapted to normally rest upon the extensions 20 of the bushings 18 while receiving members 14 are empty of liquid, thus providing a cushion or seat for floats 23 to rest upon and thereby preventing breakage of the fragile floats 23. The upper portions of the floats 23 are provided with extensions 24 having the usual graduations indicating specific gravities, and in this particular type, it is understood that where the level of the liquid rises to a certain graduation on the extension, such graduation indicates the specific gravity of the electrolyte or other liquid.

Difficulty has been encountered in the past in overcoming frictional resistance between the hydrometer float 23 and the walls of the liquid receiving members in the course of taking a reading and also due to the meniscus of the liquid surface around float stem 24 being displaced from the center of liquid surface in receiving member 14 causing inaccurate readings of graduations. This condition has been effectively overcome herein by providing split rings 25 preferably of celluloid, and spaced apart longitudinally within the liquid receiving members 14 by spacer strips 26, any number of which may be employed, there being two herein shown. These rings 25 are spaced apart substantially the length of the hydrometer float 23 and tend to maintain the float 23 in centered relation. The rings are provided with inwardly extending projections 27 spaced apart circumferentially and of a diameter slightly larger than the diameter of the float 23.

To prevent the rings 25 from accidental displacement within the liquid receiving members 14, the lower ends of the strips 26 are extended, as shown in Fig. 3, and bent inwardly at 28 to thereby engage or substantially engage the under surface of the extension 20.

The indicating device herein shown is for taking the specific gravity readings of three cells simultaneously. However, it should be understood that the invention contemplates the taking of specific gravity readings of two or more cells simultaneously and that the device may be modified in accordance with the requirements.

The liquid receiving members 14 are preferably supported in a frame which, in this instance, consists of a lower frame member 29 of light, flat material which abuts the rubber bushings 18. The tube 22 of the center liquid receiving member 14 extends through a central opening 30 in the lower frame member 29, while the tubular members 22 of the outer liquid receiving members 14 extend through elongated openings 31 therein. It will be seen, therefore, that provision is herein made for the relative adjustment between the outer liquid receiving members 14 and the center liquid receiving member 14 to thereby adapt the tubular members 22 for insertion through vent holes having different center to center distances.

An upper frame member 32 of light metal and relatively flat abuts the exposed ends of the bushings 15 and is provided with a transverse opening 33 adjacent its center through which the tubular member 17 of the center liquid receiving member 14 extends. The tubular members 17 of the outer liquid receiving members 14 extend through T-shaped slots 34 located adjacent the opposite ends of the upper frame member 32 to permit relative adjustment between the center liquid receiving member 14 and the outer liquid receiving members 14, for reasons already explained. Connecting rods 35 extend between the lower frame member 29 and the upper frame member 32 and tend to maintain the same in rigid engagement with the liquid receiving members 14 by means of nuts 36 which engage the opposite sides of the lower frame member 29 and upper frame member 32 respectively. It should be understood, of course, that to make the desired adjustment between the center liquid receiving member 14 and the outer liquid receiving members 14, the nuts 36 on the rods 35 should be loosened, and, when properly adjusted, retightened so as to hold the liquid receiving members 14 in rigid position.

The connecting rods 35 at their upper ends extend above the upper frame member 32 for a sufficient height, and extending therebetween is a strap 37 of metal or other material which is held in place by means of nuts 38 which engage opposite sides of the strap 37. This strap has a transverse opening 39 extending substantially centrally thereof, and disposed directly beneath is a cup-shaped manifold 40 preferably of celluloid. This manifold is interiorly screw-threaded and cooperates with a screw-threaded extension on a locking member 41 which has a laterally extending flange or surface adapted to engage the upper surface of the strap 37 and, when screwed into proper position, rigidly holds the manifold 40 in engagement with the under side of the strap 37, as clearly shown in Fig. 1. A centrally disposed opening 42 extends through the member 41 and transverse openings 43 are also provided in the wall of the cup-shaped manifold 40. In this particular instance, three openings 43 are shown inasmuch as three liquid receiving members 14 are provided. Tubular extensions or plugs 44 have one end secured within the openings 43 while the opposite ends are free and receive one end of flexible rubber hoses 45. The opposite ends of the flexible rubber hoses 45 are attached to one of the tubular members 17 at the upper end of the liquid receiving members 14.

Any desired suction means may be connected with the opening 42 in the member 41 communicating with the manifold 40, but I preferably provide a bulb 46 which has an open end engaging the member 41.

In the operation of the device, the tubular members 22 at the lower ends of the liquid receiving members 14 are immersed in different liquids and the bulb 46 is squeezed until relieved of substantially all the air. The bulb is then released, which creates a suction and draws the liquid through the respective tubular members 22 and into the liquid receiving members 14. The liquid coming into contact with the hydrometer floats 23 float the latter to a substantial extent and the level of the liquid where it strikes the graduated extension 24 indicates the specific gravity of the liquid. It will be seen that the reading of a number of liquids at one time is made possible by a single actuation of the bulb 46 so that comparative readings may be taken, thus eliminating the necessity of remembering the readings of the different liquids when ordinarily taken individually and successively. Additionally, a check is afforded on the specific gravity readings by a difference in height of the liquid drawn into the liquid receiving members 14 from two or more cells, one of which contains liquid whose specific gravity is substantially lower or higher than the others. This difference in the height of liquid levels is due to the hydrostatic balance of the liquid drawn into the two or more liquid receiving members 14. This feature provides an additional check on the existence of differences in the specific gravities of the liquids or electrolyte in two or more cells of a storage battery.

While I have described the preferred embodiment of the invention, it is to be understood that I am not to be limited thereto inasmuch as changes and modifications may be resorted to without departing from the spirit of the invention as defined in the appended claims.

Having thus described my invention I claim:

1. A hydrometer syringe portable by hand for simultaneously indicating the specific gravities of electrolytes in a plurality of battery cells, comprising two spaced members having spaced apertures therein, means for adjusting said spaced members relative to each other, a plurality of transparent liquid receiving members supported by said spaced members, a plurality of tubular stems extending from the lower ends of said transparent liquid receiving members and projecting through the apertures in one of said spaced members, said tubular members being supported in predetermined spaced relationship with reference to the openings in the cells whereby the hydrometer syringe may be positioned directly above the cells and the tubular members simultaneously projected through the openings in the cells by the mere lowering of the hydrometer syringe, a hydrometer float in each of said liquid receiving chambers, a plurality of tubular members extending from the upper ends of said liquid receiving members and projecting through the spaced apertures in the other of said members, and means connected to said last mentioned tubular members for creating a vacuum in said liquid receiving chambers whereby electrolytes may be simultaneously drawn into said chambers.

2. A hydrometer syringe portable by hand for simultaneously indicating the specific gravities of electrolytes in a plurality of battery cells, comprising two spaced members having spaced apertures therein, means for adjusting said members relative to each other, a plurality of transparent liquid receiving members supported by said members and adjustable relative to each other, a plurality of tubular stems extending from the lower ends of said liquid receiving members and projecting through the apertures in one of said members, said tubular members being supported in predetermined spaced relationship with reference to the openings in the cells whereby the hydrometer syringe may be positioned directly above the cells and the tubular members simultaneously projected through the openings in the cells by the mere lowering of the hydrometer syringe, a hydrometer float in each of said liquid receiving chambers, a plurality of tubular members extending from the upper ends of said liquid receiving members and projecting through the apertures in the other of said members, and means connected to said last mentioned tubular members for creating a vacuum in said liquid receiving chambers whereby electrolytes may be simultaneously drawn into said chambers.

3. A hydrometer syringe portable by hand for simultaneously indicating the specific gravities of electrolytes in a plurality of battery cells, comprising two spaced members positioned one above the other having spaced apertures therein, a plurality of transparent liquid receiving members supported by said members for adjustment relative to each other, a plurality of tubular members extending from the lower ends of said liquid receiving members and projecting through the apertures in the lower member, said tubular members being supported in predetermined spaced relationship with reference to the openings in the cells whereby the hydrometer syringe may be positioned directly above the cells and the tubular members simultaneously projected through the openings in the cells by the mere lowering of the hydrometer syringe, a hydrometer float in each of said liquid receiving chambers, a plurality of tubular members connected to the upper ends of said liquid receiving members, a third spaced member supported above the first mentioned spaced members, a suction bulb supported by said third spaced member, and means operatively connected to said suction bulb and said last mentioned tubular members whereby a vacuum may be created in said liquid receiving chambers and electrolytes simultaneously into said chambers.

ARTHUR O. CODNEY.